Dec. 22, 1970 — A. SIMON — 3,548,515
DAY AND NIGHT FOG SIMULATOR
Filed Sept. 20, 1968 — 2 Sheets-Sheet 2

CONTROLLED LIGHT FLUX DISTRIBUTION

BY COATING LINEAR LIGHT SOURCE WITH METALIZED FILM IT CONTROLS I VS. $\triangle$

HALO SPRAY APPLIED IN A PROPORTION RELATIVE TO DENSITY

EMULSION WITH DENSITY ENCODED
BASE

FILM AND LAMP MOTION WITH PITCH RELATIVE TO OPTIC AXIS

INVENTOR.
ARTHUR SIMON
BY
Herbert L. Davis
ATTORNEY

United States Patent Office 3,548,515
Patented Dec. 22, 1970

3,548,515
DAY AND NIGHT FOG SIMULATOR
Arthur Simon, Fair Lawn, N.J., assignor to The Bendix Corporation, a corporation of Delaware
Filed Sept. 20, 1968, Ser. No. 761,275
Int. Cl. G09b 9/08
U.S. Cl. 35—12          7 Claims

ABSTRACT OF THE DISCLOSURE

A fog simulator for use in an aircraft which is alternately effective to provide day and night time fog simulations. In one operative condition, the fog simulator causes an outside image to be brought into the system through telescopic optics and passed through a photographic film having a variable density coating to a diffuser to form a real image thereon, together with a halo of light about the image. A collimated lens system transforms the real image, together with the halo of light into a collimated image which the pilot may view by means of a front surface mirror as a nighttime fog simulation. In another operative condition of the fog simulator, a linear light source with distribution control is rendered effective to direct light rays through the photographic film and diffuser so as to provide at the front surface mirror for the view of the pilot a daytime fog simulation.

CROSS REFERENCE TO RELATED APPLICATIONS

The system is related to the concepts found in a "Fog Simulator and Method for Accomplishing Airborne Simulation of a Fog" disclosed and claimed in a copending U.S. application Ser. No. 604,476, filed Dec. 23, 1966, by Paul A. Noxon, now U.S. Pat. No. 3,427,730, granted Feb. 18, 1969 and assigned to the Bendix Corporation.

BACKGROUND OF THE INVENTION

Field of the invention

The present invention relates to means for simulating atmospheric conditions and, more particularly, to the simulation of fog, as a visual display, as viewed from an aircraft to facilitate the training and testing of aircraft operations by varying simulated fog density so as to approximate visual effects under true fog conditions.

Description of the prior art

A description of the prior art, and the attendant problems to which the present invention is directed are set forth in the aforenoted U.S. Pat. No. 3,427,730. Further in the aforenoted application, there were required separate systems for daytime and nighttime simulations of fog effects. Also, the system disclosed in the aforenoted U.S. Pat. No. 3,427,730 required separate paths for the fog image and the true world. The present invention provides an arrangement in which the fog simulator may be alternately utilized for both night and day simulations. Also the fog image and the true world utilize only one path.

SUMMARY OF THE INVENTION

The present invention is directed to an improved fog simulator in which the outer world image is transmitted through a fog film to form a real image on a diffuser to provide a night fog simulation while a linear light source means is alternately operable to provide a day fog simulation.

DESCRIPTION OF THE PREFERRED EMBODIMENT

Figure 1:
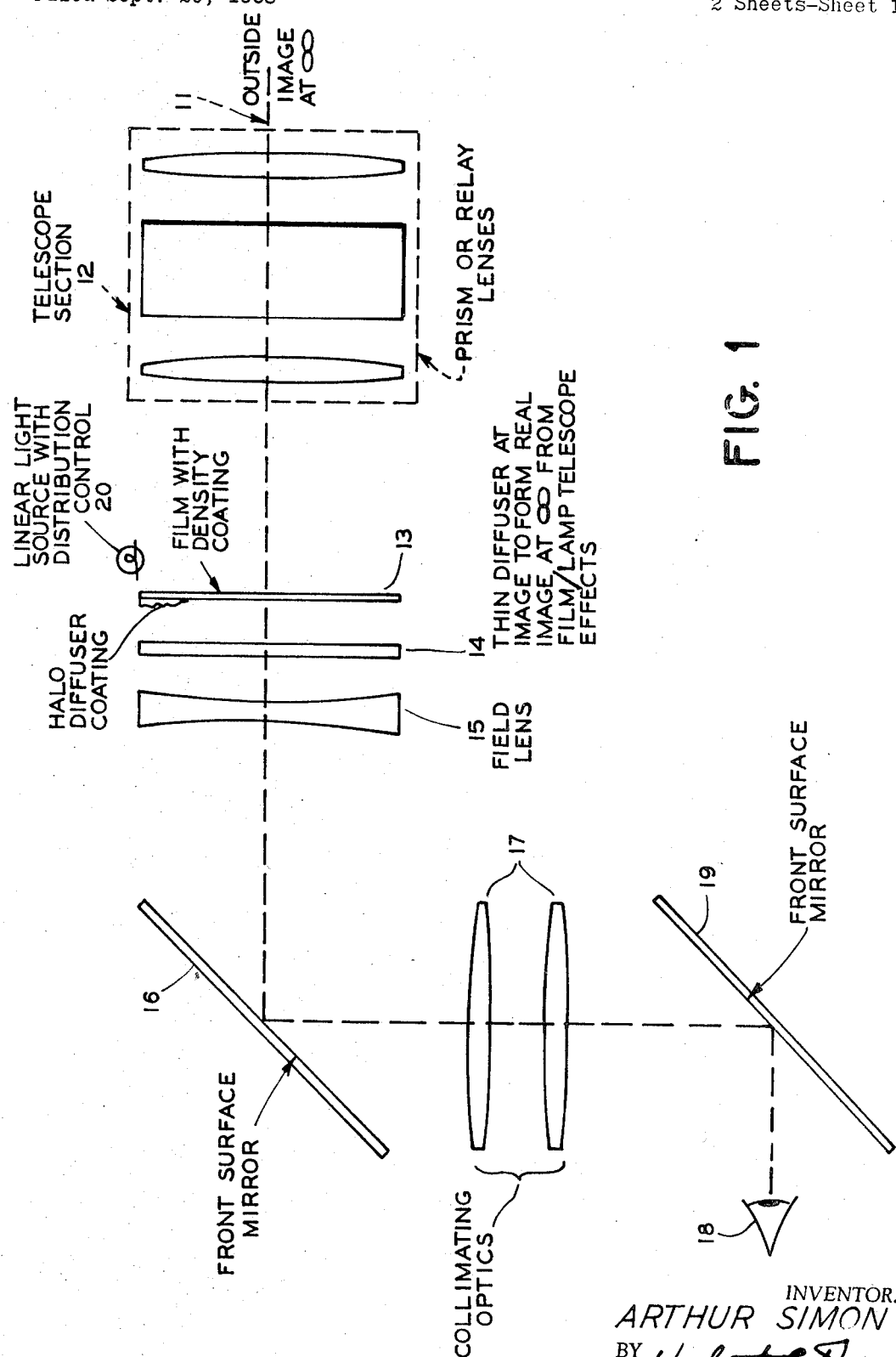
FIG. 1 is a diagrammatical representation of a fog simulator system embodying the invention.

Referring now to FIG. 1 of the drawing, an image of the outside world, represented by the dashed line 11, is focused by telescopic lens 12 and impinges on a fog film 13. The image 11 is attenuated and diffused by the fog film 13 from which it passes to form a real image on a diffuser 14. A collimating system including a field lens 15, front surface mirror 16 and collimating lens 17 transforms the real image from the diffuser 14 which a pilot, represented by eye 18, views by a display means or mirror 19.

Figure 2:
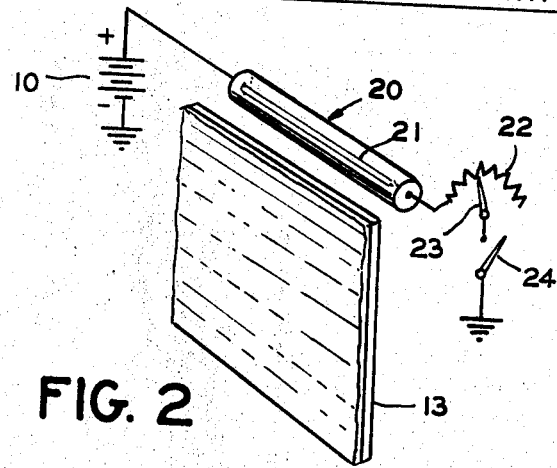
FIG. 2 is a perspective view of a fog film and light source utilized in the invention.
Figure 3:
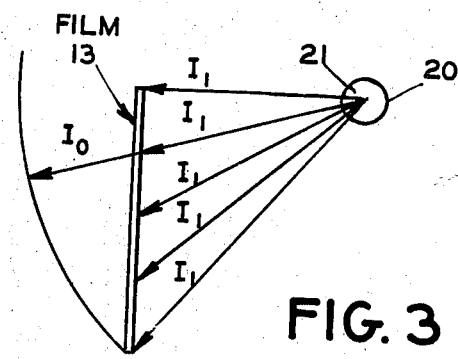
FIG. 3 is a diagram illustrating the light distribution.
Figure 4:
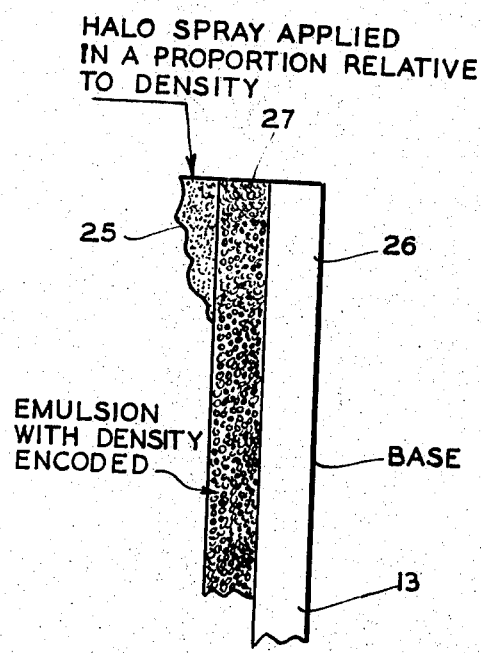
FIG. 4 is an edge view of a section of fog film.

The system thus far described is useful for night fog simulation. In order to simulate day ambient effects, a linear light source means 20 is located adjacent to the film 13. The light means 20 is coated with a metalized surface 21, see FIGS. 2 and 3, to control the distribution of the light emitted therefrom. As illustrated in FIG. 3, the coating 21 is such that there is uniform distribution of the light over the film 13. The light means 20 has one side connected to one terminal of a suitable source of electrical energy or battery 10 while the opposite terminal of the battery 10 is connected to ground.

The opposite side of the light means 20 is connected by a resistor 22, an operator-operative movable contact 23 and another operator-operative switch 24 to ground.

Figure 5:
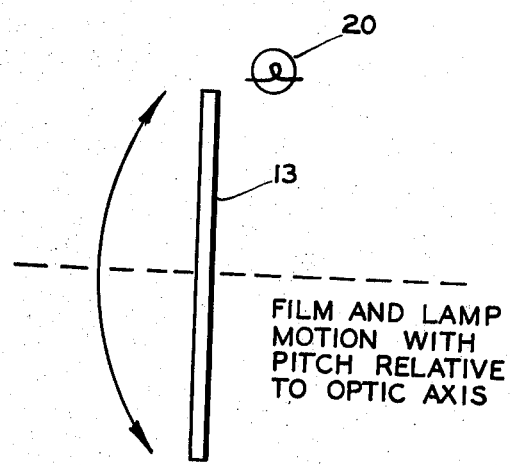
FIG. 5 illustrates motion of the film and light.

The film 13 is also controlled by light diffusing means, such as a spray, sand blast, or other suitable means 25, to form a halo of light at the appropriate density values about the real image from the outside world focused thereon by the telescopic lens 12 to provide a nighttime fog simulation. In addition to the light diffusing means 25 to effect such halo of light, the film 13 includes a base 26 and an emulsion 27 with the required density encoded thereon to provide the desired fog effect. The film moves in a vertical or near vertical motion to compensate for pitch changes of the vehicle as illustrated in FIG. 5. It also moves for changes in altitude. The means for moving the film 13 for changes in pitch and altitude may be similar to those described in the aforenoted U.S. Pat. No. 3,427,730.

In the operation of the system, for night fog simulation, the light source 20 is de-energized by the operator opening the switch 24 or adjusting the movable contact 23 to sufficiently de-energize the light means 20 to render the same ineffective to provide the required backscatter illumination, and for day fog simulation the light means 20 is energized by the operator closing the switch 24 and adjusting the movable contact 23 to energize the light means 20 sufficiently to furnish the required backscatter illumination. Thus, the one device combines both night and day simulated fog effects by operation on the true world light image by attenuation (film density) and diffusion (spray, sand blast) to provide a halo of light about the image to effect a nighttime fog simulation, and alternately providing a backscatter illumination (controlled light and diffuser) to effect a daytime fog simulation.

Although only one embodiment of the invention has been illustrated and described, various changes in the form and relative arrangement of the parts, which will now appear to those skilled in the art, may be made without departing from the scope of the invention.

What is claimed is:
1. A day and night fog simulator system comprising a diffuser, means including an optical system for focusing a real world image on said diffuser, a fog film interposed between said diffuser and said optical system for attenuating said image, linear light means to interpose light rays between said optical system and said fog film, means for controlling the light means, the control means being operative in one sense to render the light means effective to condition the system for day fog simulation, and the control means being operative in another sense to so control the light means as to condition the system for night fog simulation, a display means, and means including a collimating lens system operative for transmitting said image from said diffuser to said display means for viewing upon operation of said control means in said other sense for night fog simulation, and said collimating lens system being operative for transmitting light rays supplied by said light means through said fog film and diffuser to said display means for viewing upon operation of said control means in one sense for day fog simulation.

2. The combination defined by claim 1 in which said fog film includes a light diffusing coating to form a halo of light upon operation of said control means in said other sense for night fog simulation.

3. The combination defined by claim 1 in which said linear light means includes a coated metalized surface to control light distribution upon operation of said control means in said one sense for day fog simulation.

4. The combination defined by claim 1 in which said control means includes operator-operative means for disconnecting said light means from said system upon operation of said control means in said other sense for night fog simulation.

5. The combination defined by claim 1 in which said fog film attenuates and diffuses said image upon operation of said control means in said other sense for night fog simulation and said light means provides controlled backscatter illumination upon operation of said control means in said one sense for day fog simulation.

6. The combination defined by claim 1 in which said control means includes means for controlling the light means so as to vary intensity of the light rays interposed between said optical system and said fog film to vary the fog simulation upon operation of the control means in said one sense for day fog simulation.

7. The combination defined by claim 1 in which said fog film attenuates and diffuses said image and includes a halo forming coating effective upon operation of said control means in said other sense for night fog simulation, said linear light means includes a coated metalized surface to control light distribution upon operation of said control means in said one sense for day fog simulation, said control means includes first operator-operative means for disconnecting said light means from said system upon operation of said control means in said other sense for night fog simulation, and second operator-operative means for controlling the light means so as to vary intensity of the light rays interposed between said optical system and said fog film upon operation of the control means in said one sense for day fog simulation.

References Cited

UNITED STATES PATENTS

| | | | |
|---|---|---|---|
| 3,427,730 | 2/1969 | Noxon | 35—12 |
| 3,436,840 | 4/1969 | Noxon | 35—12 |

EUGENE R. CAPOZIO, Primary Examiner

P. V. WILLIAMS, Assistant Examiner